United States Patent
Kellermeier

[11] Patent Number: 5,979,830
[45] Date of Patent: Nov. 9, 1999

[54] METHOD AND ARRANGEMENT FOR KEEPING A GEOSTATIONARY SATELLITE CLUSTER ON A DEDICATED POSITION BY EMPLOYING AN OPTICAL INTERSATELLITE LINK

[75] Inventor: Johann Kellermeier, Neubiberg, Germany

[73] Assignee: Oerlikon Contraves AG, Zurich, Switzerland

[21] Appl. No.: 08/956,551

[22] Filed: Oct. 23, 1997

[30] Foreign Application Priority Data

Nov. 15, 1996 [CH] Switzerland ........................ 2828/96

[51] Int. Cl.$^6$ .................................................. B64G 1/10
[52] U.S. Cl. .................... 244/158 R; 455/427; 455/13.1; 244/176
[58] Field of Search ................. 244/176, 158 R, 244/173; 701/13; 342/357; 455/427–43, 12.1, 13.1, 13.2

[56] References Cited

U.S. PATENT DOCUMENTS

| | | | |
|---|---|---|---|
| 4,375,697 | 3/1983 | Visher | 244/158 R |
| 4,427,882 | 1/1984 | Nakaoki et al. | 250/231 SE |
| 4,691,882 | 9/1987 | Young | 244/158 R |
| 4,709,580 | 12/1987 | Butts, Jr. et al. | 244/158 R |
| 5,043,903 | 8/1991 | Constant | 701/13 |
| 5,119,225 | 6/1992 | Grant et al. | 244/158 R |
| 5,160,935 | 11/1992 | Inamiya | 342/357 |
| 5,267,167 | 11/1993 | Glick | 244/176 |
| 5,396,643 | 3/1995 | Frenzer et al. | 455/13.1 |
| 5,506,780 | 4/1996 | Montenbrck et al. | 701/13 |
| 5,810,297 | 9/1998 | Basuthakur et al. | 244/176 |

FOREIGN PATENT DOCUMENTS

| | | |
|---|---|---|
| 0 284 075 | 9/1988 | European Pat. Off. . |
| 42 43 395 A1 | 6/1993 | Germany . |
| 2 288 038 | 10/1995 | United Kingdom . |
| WO 92/20576 | 11/1992 | WIPO . |

OTHER PUBLICATIONS

U.S. application No. 08/882,266, Czichy et al., filed Jun. 26, 1997.
U.S. application No. 08/931,646, Wandermoth et al., filed Sep. 16, 1997.

*Primary Examiner*—Galen L. Barefoot
*Attorney, Agent, or Firm*—Townsend and Townsend and Crew LLP; Guy W. Chambers

[57] ABSTRACT

The instant invention comprises a method and arrangement for station keeping a geostationary satellite cluster, employing an optical intersatellite connection constituted of a number of satellites (14F to 14K), which are located in a common, limited area, for example 0.1, on the geostationary orbit. In this case the position of the satellite cluster is determined by the temporarily selected master satellite (14J), which receives its correction commands via a ground station (17) and which sees to it that such corrections are simultaneously performed by the remaining satellites of the cluster.

8 Claims, 3 Drawing Sheets

METHOD AND ARRANGEMENT FOR KEEPING A GEOSTATIONARY SATELLITE CLUSTER ON A DEDICATED POSITION BY EMPLOYING AN OPTICAL INTERSATELLITE LINK

FIELD OF THE INVENTION

The instant invention relates to a method and an arrangement for keeping a geostationary satellite cluster on a dedicated position by employing an optical intersatellite link, which is generated between a number of satellites located in a common limited area in the geostationary orbiting means of optical intersatellite link terminals.

BACKGROUND OF THE INVENTION

In connection with the conventional method of keeping a geostationary satellite in position, the satellite should continuously be located in a predetermined longitudinal and latitudinal area within the so-called tolerance window. To assure this, course surveys, called orbiting, are performed in the prior art at suitable times by means of one or several appropriately equipped ground stations, with the aid of which the exact satellite position is determined and predicted, i.e. orbit determinations and predictions are performed. In order to prevent a departure from the tolerance window, caused by natural or forced orbit perturbations, i.e. to assure station keeping, orbit correction maneuvers are calculated in the ground control center and are transmitted for execution to the satellite by a ground station. The required command sequence is generated on the ground, checked and transmitted to the satellite. The reaction of the satellite is checked in each intermediate step from its telemetry data.

Because of increased utilization and subdivision of the geostationary orbit, however, common tolerance windows are assigned to several satellites by the responsible authorities, i.e. the satellites are co-positioned. Tests have shown that because of an uncoordinated station keeping within a tolerance window a risk of collisions exists for the satellites, which cannot be neglected.

The risk of collisions can be considerably reduced by appropriately coordinated station keeping strategies, which provide defined differences, setting the so-called nominal relative trajectories, between the orbital elements of individual satellites. Frequently discussed strategies utilize a longitudinal separation, an eccentricity vector separation or a coordinated eccentricity/inclination vector separation. For example, the French telecommunications satellites TDF-1 and TDF-2 at 18.8 W. longitude are maintained in a tolerance window of a size of 0.2×0.2 degrees by means of different eccentricity vectors. The British satellites BSB-1 and BSB-2 at 31 W. longitude are the subject of a coordinated eccentricity/inclination vector separation.

Orbiting by ground stations generally result in relatively large orbit determination errors regarding the longitudinal position of the satellites. This disadvantageous effect is increased by orbit correction maneuvers, in particular inclination maneuvers, which in the course of their execution are also error-prone in regard to size and direction, in that an additional unintentional longitudinal drift can occur. Safety, which is reduced for these reasons, requires larger amounts in the separation between the orbit elements eccentricity and inclination in connection with station keeping of several satellites within a tolerance window which, however, results in an unnecessarily extensive utilization of the available area of the tolerance window and limits the possible number of satellites per window.

A further disadvantage of orbiting by ground stations lies in that the geometry of the position of a geostationary satellite to be surveyed only changes little and slowly, namely with a period of one day. Therefore a time expenditure of approximately two days is required today for a sufficiently accurate orbit determination. But more accurate and rapid orbit survey or orbit determination methods are necessary in order to do justice over time to the increasing number of satellites in the geostationary orbit.

Practical experience has shown that the coordinated station keeping within a tolerance window, whose area was assigned to different countries for use, is made more difficult for a number of reasons. For example, in most cases satellites operated by different countries are surveyed and controlled by different ground stations. This decentralized control results in that the station keeping methods, which are the same in principle, are multiplied, and additional efforts are required for the coordination of the ground control centers, for example for matching the tracking systems and calculation programs. In turn, this results in a large expenditure of time, elaborate data transfers and considerable costs. At the same time the range of possible error sources is increased. Furthermore, the required detailed command sequence on the ground for executing an orbit maneuver, and checking it step-by-step from the ground are extremely expensive.

In addition to this general prior art, a method for the coordinated station keeping of a satellite cluster in one position is proposed in German Published, Non-Examined Patent Application DE-OS 42 43 395 A1, wherein only a single satellite in the cluster is surveyed and controlled from the ground. The other satellites are subject to the control of this satellite, identified as MASCOT (Multiple Application Satellite for Cluster Control and Operational Tasks) which, besides its actual task as, for example, a telecommunications satellite, in addition takes over control of the entire cluster. In this case all satellites of the cluster, except for MASCOT, are separated from each other by means of combined eccentricity and inclination vector separation, this means, each satellite moves on an elliptical orbit around the earth, wherein the degrees of longitude of the points closest and farthest from earth of the orbits of these satellites, without taking the intrinsic rotation of the earth into account, are different. For an observer rotating along with the earth, at different times of day the satellites appear to be sequentially closest to or farthest away from the earth. Since furthermore a satellite moving on an elliptical orbit always covers equal areas in the equal intervals of time with its local vector originating from the center of rotation, periodically repeated deviations from the mean position of the satellite regarding its geographical longitude can also be detected by an observer turning with the earth. It can be observed inside the satellite cluster that, in a superimposition on an ideal circular orbit, the individual satellites move around the earth on an ellipse, on which the satellites of the cluster circle each other in the course of a day. In order to avoid observation, the orbital plane of each satellite is inclined differently in respect to the equatorial plane of the earth, because of which the satellites circle each other on an ellipse which is inclined in respect to the equator, because of which each satellite always has an unimpeded dissemination path in the direction toward the earth. As an essential part of this strategy, the MASCOT is positioned on this ellipse in such a way, that it can determine its relative position in respect to each other satellite of the cluster by means of optical or microwave radar, and furthermore can exchange data with each satellite of the cluster by means of wireless.

Thus, MASCOT has been assigned the task of controlling all remaining satellites and, if required, to initiate corrections in the trajectory of individual satellites in respect to MASCOT. Furthermore, collective corrections regarding the entire satellite cluster are executed via MASCOT, whose position is surveyed by a ground station and represents the position of the satellite cluster. Commands for orbit corrections are routed via this satellite to all the others. wherein the position of the other satellites in the cluster are surveyed and, if necessary, corrected through MASCOT. Since most of the installations required for these operations are installed in MASCOT, at least one reserve system is provided for each satellite cluster in order not to lose the entire satellite cluster in case of a malfunction.

An essential disadvantage of this method lies in the central importance of a single satellite, provided with special equipment, wherein possible savings in connection with the other satellites of the cluster must be weighed against the mission reliability. Furthermore, the arrangement of the satellites in respect to each other is basically limited to the combined application of the eccentricity and inclination vector separation, and an per se ideal arrangement on tightly staggered geographical longitudes is not possible because of the lack of transmission paths past the respectively adjoining satellites.

Thus, a specially embodied satellite is always required for taking on the master function, i.e. at least one further master must be placed in the cluster in order to take over the replacement function if required, for example when the actual master fails.

OBJECT AND SUMMARY OF THE INVENTION

It is therefore the object of the invention described in what follows to avoid the disadvantages of the prior art and to make possible, independently of the selected arrangement of individual satellites of a satellite cluster positioned at a commonly utilized location, the determination of the satellite positions in respect to each other and the arrangement of mutual orbit corrections, and thus the correction of the relative positions of individual satellites in respect to each other.

This object is attained in that
a master function is assigned to one satellite of a satellite cluster, and a coordinate system applicable to the entire satellite cluster is determined from this for surveying the remaining satellites,
the master selected in this manner is in contact with the ground station and therefore also determines the cluster position,
with at least N-2 satellites, a precise distance measurement as well as angular measurements defining a direction are initiated via transmission paths to its two neighbored satellites arranged in tightly staggered geographical longitudes ('cluster chain formation'),
with all satellites, a precise distance measurement as well as angular measurements defining a direction are initiated via intersatellite links to at least one satellite arranged in direct vicinity,
from these distance and angular measurements, a position determination is made
a corresponding position correction is initiated and executed by all satellites of the cluster based respectively on the position determination which had taken place.

Based on their low weight and small space requirements, optical transmission devices now have gained in importance for the data exchange between satellites, instead of directional microwave transmission installations. Proposals for optical terminals already exist, which permit the simultaneous transmission in both directions of an intersattelite link and simultaneously allow the precise determination of the distance from each other of both satellites involved (Swiss Patent Applications 2414/96 and 2415/96). Since the linkage between geostationarily orbiting satellite clusters appears to be necessary anyway because of mission aspects, for example because several satellites of a cluster support very large antennas, on whose utilization users, who operate via neighboring satellites, are also dependent, these installations offer themselves for the synergetic utilization in connection with the determination of the relative positions of all satellites of a cluster, as well with their mutual alignment.

To minimize the number of optical terminals required, each satellite of a cluster makes bidirectional contact with its two nearest neighbors by means of two terminals. If the satellites are arranged by means of combined eccentricity vector and inclination vector separation, they will circle each other on an ellipse. The intersatellite links via the respectively closest neighbors results in an optical network with a ring-shaped topology, in which data can be passed on from one satellite to the other by means of bidirectional transmissions in both directions of circulation. Such networks, based on fiber optics, are already employed on a large scale on earth ("FDDI, Überblick und Anwendung" [Summary and Application], Chr. P. Wrobel, VDE Publishers, Berlin).

If the arrangement on tightly staggered geographical longitudes is preferred, the closed ring connection turns into a chain, open at the end of the cluster. It is possible within this optical network to exchange the inherent "capabilities" provided by the optical terminals software and the obtained data regarding the distance as well as the direction toward the two closest neighboring satellites among all participating stations, provided they are not the end or corner satellites of the chain formation. Thus the complete information regarding the relative position of all satellites in respect to their neighbors can be made available in each satellite, and this doubly redundant, since measurements are taken by both satellites which are part of a connection.

Thus a defined, but in principle arbitrary, correctly positioned satellite of the cluster can be designated as the origin of a coordinate system which is applicable to the entire cluster. Each one of the other satellites determines its relative position in respect to this satellite by adding together all distances between the satellites located between them.

In this case the arrangement by means of a combined eccentricity vector and inclination vector separation permits a double redundancy in both directions of the ring.

The relative positions of the satellites in respect to each other are maintained in that preferably all satellites exchange the measured data regarding the relative positions in respect to each other and autonomously perform correcting maneuvers in accordance with their respective programmed predetermined position, wherein the master satellite takes up the reference position via the ground control station.

Generally satellite clusters are installed sequentially by means of several rocket starts. Earth satellite must be monitored by the ground station during the transfer- and injection phase to the geostationary orbit. Since for this reason appropriate transmission installations are necessary anyway within the satellite, in the geostationary orbit it is later possible in principle to control each satellite independently. The threat of a collision alone requires a coordinated strategy for all satellites of a cluster, i.e. control from a single ground station.

If the ground station issues a command for a corrective maneuver to a selected satellite, this master satellite is capable of initiating simultaneous corrective maneuvers for all satellites of the satellite cluster via the optical satellite connection, wherein the relative positions in respect to the master satellite are autonomously maintained by means of the respective onboard computers.

Particularly suitable or advantageous arrangements are, for one, an elliptical arrangement in a plane which is tilted in respect to the equatorial plane by a predetermined amount about the east as well as about a radial axis, this is done, on the one hand, in the direction of the east axis in order to assure unimpeded transmission paths to earth for each satellite of the cluster and, on the other hand, to reduce the danger of collision between satellites of the same cluster, which is particularly great in the east-west direction. Otherwise it is the arrangement in a chain formation on exactly the same orbit with dense staggering in respect to the degrees of longitude, wherein a method for distance measuring described in Swiss Patent Application 2415/96 is profitable, in accordance with which it is only necessary to prevent observation between directly neighboring satellites.

A further advantage of the invention results from the synergetic utilization of devices already provided for other uses for communications between satellites. Furthermore, there is no limitation in the selection of the arrangement of the satellites within a cluster.

No special satellite is additionally required for the control of the satellite cluster. Instead, it is always possible to utilize another satellite of the satellite cluster for representing the reference position in case an optical terminal (i.e. one of the two satellite links) of the satellite selected as the master fails. The latter then is delegated to the respective end or the beginning of the cluster and is maintained at a relative distance from the neighboring satellite by means of the remaining terminal. The ring or the chain need not be closed in this case.

Further details, characteristics and advantages of the invention not only result from the claims and the features which can be taken, individually and/or in combination, from them, but also from the following description of a preferred exemplary embodiment.

DETAILED DESCRIPTION OF THE PREFERRED EMBODIMENT

Figure 1:
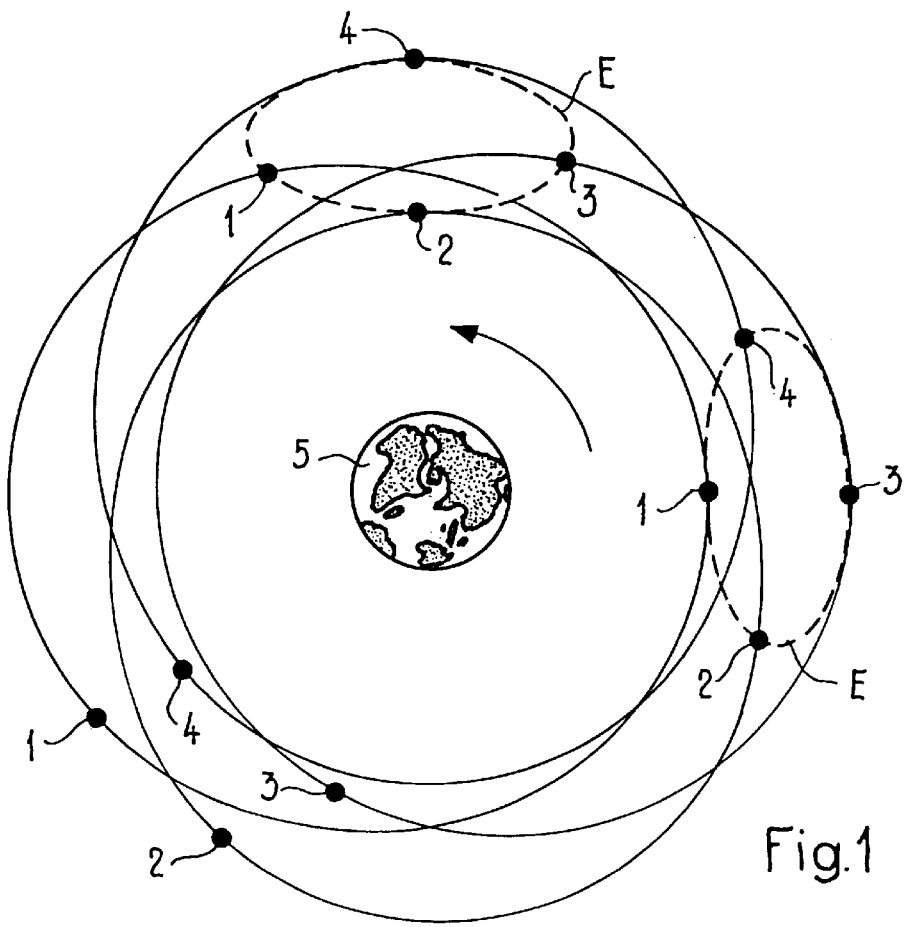
FIG. 1 represents the earth orbit of four satellites arranged in respect to each other by means of an eccentricity vector separation.
Figure 2:
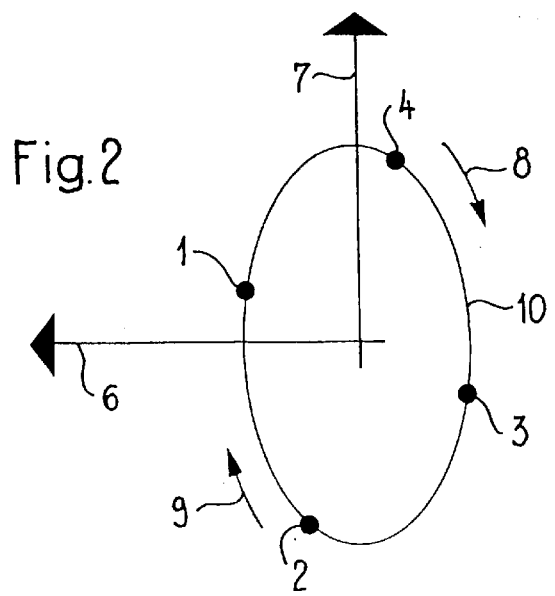
FIG. 2 represents the mutual circulation of these four satellites on an ellipse.

The earth orbits of four satellites 1, 2, 3 and 4 around the earth 5 are represented in FIG. 1. The four satellites 1, 2, 3 and 4 are respectively represented on their earth orbits at three different times. The points closest to earth of all satellites are ideally evenly spread over 360 degrees. It is possible to understand from the satellite cluster represented at three different times, how the satellites circle each other in the course of one earth orbit. This mutual circling takes place on an ellipse E, as represented in dashed lines in FIG. 1 and for better understanding in FIG. 2.

In this case the direction of an axis 6 points toward the center of the earth, a further axis 7 represents the direction in which the satellite cluster moves. Arrow 8 and arrow 9 indicate the direction of movement of the individual satellites 1, 2, 3 and 4 on an ellipse 10, which each satellite performs in a closed loop during the complete earth orbit of the cluster.

Figure 3:
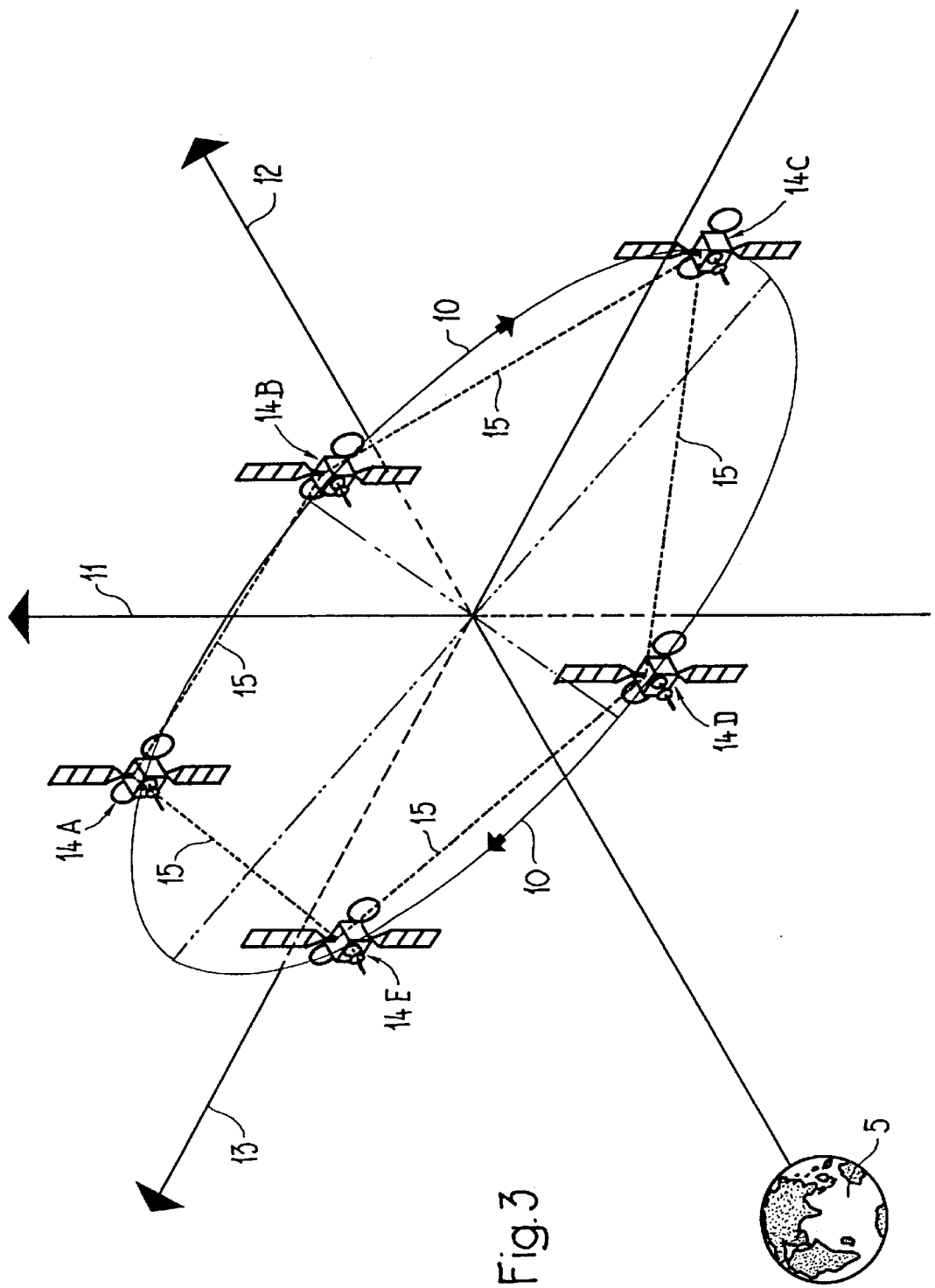
FIG. 3 represents a satellite cluster, whose satellites are arranged in respect to each other by means of a combined eccentricity and inclination vector separation.

FIG. 3 represents the combined employment of the eccentricity and the inclination vector separation. It can be seen here, that the plane of the ellipse 10 on which satellites 14A, 14B, 14C, 14D and 14E of a satellite cluster circle each other can be determined by an eastward pointing axis 13 as well as a radially outward pointing axis 12 of a coordinate system, which has its origin in the center a plane bordered by the ellipse 10 and which consists of the axes 12 and 13 as well as an axis 11 pointing northward. This corresponds to the automatic movement, generated by the flattening of the earth, of a satellite cluster arranged in a ring. It is assured by means of this that each satellite always has an unimpeded transmission link towards the earth. The coordinate system consisting of the axes 11, 12 and 13 can be imagined to be displaced to an arbitrary, correctly oriented satellite 14A, wherein all other satellites 14B, 14C, 14D and 14E determine their relative positions from this, in that the length and direction of the intersatellite links 15 of the wireless communications net to their respective neighbors are measured by the inherent ranging capability of optical intersatellite link terminals installed on all satellites 14. These ranging data of the optical intersatellite links can be added up and are available, stored in the terminals.

If the satellite 14B is selected as the origin of the coordinate system, the relative position of the satellite 14C is determined in that the direction in azimuth and elevation as well as the length of the intersatellite link 15 established between the satellites 14B and 14C is determined by range measurements of the intersatellite link terminal located on board of the satellite 14B, which maintains the link to the satellite 14C. Conversely, it is possible to perform the same measurement by means of the corresponding terminal on satellite 14C. The data obtained by the intersatellite link terminals can be exchanged between the satellites 14B and 14C. The information regarding the relative position in respect to each other is then available in both satellites. The next step then is the determination of the relative positions of the satellites 14C and 14D in respect to each other. In the process the link distance is measured between the two involved satellites 14C and 14D by the optical intersatellite terminals.

The difference in direction under which the intersatellite link 15 between the satellites 14B and 14C is seen if measured in satellite 14B and in satellite 14C, respectively allows to determine the offset of the two satellites in respect to each other. In this way the direction of the dissemination path 15 between the satellites 14C and 14D in respect to the coordinate system can be determined in the satellite 14B. It is therefore possible to determine the relative position of the satellite 14D to the satellite 14B by adding the components of the intersatellite links 15, considered as vectors, between the satellites 14B and 14C as well as 14C and 14D. This method can be continued when determining the relative position of the satellites 14E and 14A in respect to the satellite 14B, wherein in case of the satellite 14E it is more advantageous to measure the dissemination path 15 to the satellite 14A. With the satellites 14D and 14E it is possible to determine their positions by means of two different additions of intersatellite links and to achieve an increase in accuracy by averaging. On the one hand, there is the option of combining all data regarding the relative positions of the satellites 14C to 14E in respect to the satellite 14B in one satellite via the wireless transmission paths existing between the satellites 14B to 14E, to evaluate them in the on-board computer there and to initiate possible corrections in the satellites. On the other hand it is also possible to collect the data in the on-board computers of each satellite, wherein each satellite 14C to 14E determines its relative position in respect to the satellite 14B and, if required, performs corrections of its own position autonomously.

To change or correct the orbit positions of the entire satellite cluster, the same movements have to be performed simultaneously by all satellites 14A to 14E. In general, two movements are caused in a satellite for an orbit correction. For one, the inclination of the orbit in respect to the plane determined by the earth's equator is changed by a movement in a north or south direction. This is performed by a short term operation of the thrusters, this causes simultaneously a displacement in the east or west direction. If the thrust vector during an orbit inclination change is not exactly oriented to a north or south direction, a movement in a west or east direction takes place simultaneously. Since a displacement in the west or east direction requires a lot less energy, even small deviations from the thrust direction show results. Since furthermore the directions of thrust of the satellites 14A to 14E would hardly coincide exactly when all satellites 14A to 14E perform a corresponding maneuver simultaneously, considerable changes in the relative positions of the satellites 14C to 14E in respect to the satellite 14A are to be expected after such a maneuver in the east or west direction. Following an orbit correction of the entire satellite cluster, the intersatellite links between the satellites 14A to 14E, which possibly could have been interrupted by microvibrations caused by the thruster operation, are reinstated and the relative positions of the satellites 14C to 14E in respect to the satellite 14B are newly determined, whereupon either each satellite 14C to 14E autonomously restores its relative position to the satellite 14B, or executes this on command from a specially provided satellite. Since shortterm interruptions of the wireless connection can be caused by the operation of the thrusters, it is advantageous to proceed in a manner wherein, after all required position changes have been calculated in a previous phase, the corrections of all relative positions of the satellites 14C to 14E in respect to the satellite 14B take place at the same time.

Figure 4:
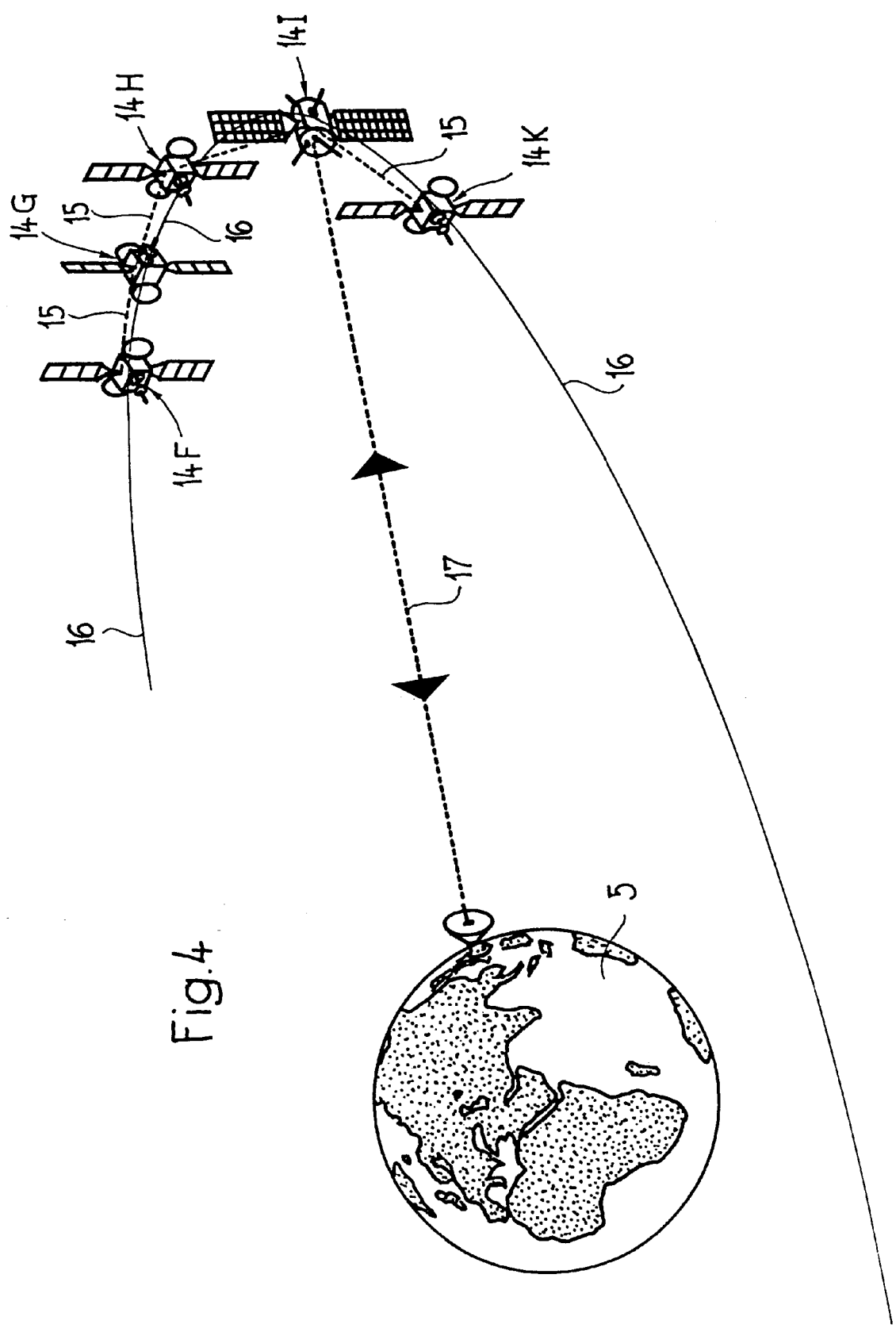
FIG. 4 represents the arrangement of a satellite cluster in the form of a chain formation on tightly staggered degrees of longitude.

FIG. 4 represents a satellite cluster arranged on tightly staggered degrees of longitude in a so-called chain formation. In contrast to the arrangement represented in FIG. 3, normally only the respectively missing neighbor of the satellites 14F and 14K is at the end of an unimpeded intersatellite link because of the slight curvature of the common earth orbit 16. This necessitates that these two satellites 14F and 14K are so-called corner and/or end satellites and have no connection with their second neighbor. They are therefore not suited to take over the master function.

Thus, if a staggering of satellites along the same earth orbit 16 takes place, it is possible for maintaining a safe distance to keep distances between 4 to 6 km between two satellites, i.e. it is possible to position up to twelve satellites on one geostationary orbit position of only 0.1 (=74 km).

This is a function of the so-called 3 σ measuring error of the relevant ground station 17, which determines the position of a selected master satellite in the cluster, in this case 14J.

It is therefore possible in accordance with the instant invention for the selected master to be a predetermined satellite. However, preferably it will be an arbitrary satellite which alone is connected with the ground station. The master function is therefore preferably present in several or all satellites, so that in case of an outage the master function can be assumed by another satellite. Earth and sun sensors are employed as the reference for angular measurements whilst flywheels/gyroscopes stabilize the satellites about the 3 body axes. In its movement, the selected master satellite takes along an orthogonal coordinate system, whose positive Z-axis (yaw axis) is directed toward the earth's center, and whose positive X-axis (roll axis) is located in the orbital plane and is respectively tangent to the earth orbit, and wherein the Y-axis (pitch axis) is located perpendicularly to the orbital plane. This coordinate system is then obligatory for surveying the remaining satellites, wherein at least N-2 satellites are embodied in such a way that preferably they perform measurements in pairs from one to the other and vice versa. The satellites are preferably located in a common limited area of at most 0.12 or 0.15 or 0.25 degrees on the geostationary orbit.

What is claimed is:

1. A method for keeping a geostationary satellite cluster in a desired position by employing bidirectional optical intersatellite links, which satellite cluster is constituted of a plurality of satellites, which are each configured to be able to assume a master function, located in a common limited area in geostationary orbit, comprising:

assigning a master function to one satellite of said satellite cluster;

having said master function satellite be in contact with a ground station;

having each satellite make a precise distance measurement as well as angular measurements defining a direction for at least one of the satellites closest to it using said bidirectional optical intersatellite links and communicating said measurements through said bidirectional optical intersatellite links to all of the other satellites in said cluster, calculating at said ground station or in said master function satellite a desired position determination for all satellites in said cluster from said distance and angular measurements, having a corresponding position correction executed by all satellites of the cluster under the leadership of said master function satellite in order to achieve said desired positions.

2. The method for keeping a geostationary satellite cluster in position in accordance with claim 1, wherein the optical intersatellite links are identical with the communications paths on which the information transfer between the individual satellites of the satellite cluster takes place.

3. The method for keeping a geostationary satellite cluster in position in accordance with claim 1, wherein the correction maneuvers are initiated by means of commands from said ground station, sent via said selected master function satellite to all satellites, and are performed at the same time by all satellites of the satellite cluster.

4. The method for keeping a geostationary satellite cluster in position in accordance with claim 1, wherein the position correction is automatically performed periodically in accordance with a tolerance allowance stored in the on-board computers of the individual satellites of the satellite cluster.

5. The method for keeping a geostationary satellite cluster in position in accordance with claim 1, wherein, in a chain satellite formation arrangement, the master function is respectively assigned to the satellites which are not placed at an end position of the formation of the cluster.

6. The method for keeping a geostationary satellite cluster in position in accordance with claim 1, wherein the satellites are located in a common, limited area of at most 0.2 degrees on the geostationary orbit.

7. The arrangement in accordance with claim 1, wherein the satellites forming a satellite cluster are moving on an approximately elliptical trajectory; and the plane constituting the elliptical trajectory is tilted around the East as well as the radial axis by a predetermined amount in respect to an equatorial plane.

8. The arrangement in accordance with claim 1, wherein the satellites forming a satellite cluster are conducted by narrow tolerances in respect to inclination and eccentricity and are arranged on an approximately chain-like trajectory; and no unimpeded intersatellite links exist between the end satellites.

\* \* \* \* \*